(12) United States Patent
Forrest

(10) Patent No.: US 6,823,172 B1
(45) Date of Patent: Nov. 23, 2004

(54) SELF-SERVICE TERMINAL INCLUDING WIRELESS COMMUNICATION

(75) Inventor: Simon J. Forrest, Dundee (GB)

(73) Assignee: NCR Corporation, Dayton, OH (US)

( * ) Notice: Subject to any disclaimer, the term of this patent is extended or adjusted under 35 U.S.C. 154(b) by 466 days.

(21) Appl. No.: 09/703,273

(22) Filed: Oct. 31, 2000

(30) Foreign Application Priority Data

Nov. 20, 1999 (GB) .............................................. 9927372

(51) Int. Cl.$^7$ ............................................... H04B 7/00
(52) U.S. Cl. .................... 455/41.2; 455/41.1; 455/90.3; 455/90.2; 455/66.1
(58) Field of Search ........................... 455/41, 66, 402, 455/106, 41.1, 41.2, 41.3, 66.1, 90.1, 90.2, 90.3

(56) References Cited

U.S. PATENT DOCUMENTS

| | | | | |
|---|---|---|---|---|
| 4,063,229 A | * | 12/1977 | Welsh et al. ................. 340/571 |
| 4,454,414 A | | 6/1984 | Benton | |
| 4,650,977 A | * | 3/1987 | Couch ......................... 235/379 |
| 4,817,091 A | * | 3/1989 | Katzman et al. ................ 714/8 |
| 5,335,366 A | * | 8/1994 | Daniels .................... 455/575.5 |
| 5,442,568 A | | 8/1995 | Ostendorf et al. | |
| 5,613,012 A | | 3/1997 | Hoffman et al. | |
| 5,621,913 A | * | 4/1997 | Tuttle et al. ................... 455/90 |
| 5,639,989 A | * | 6/1997 | Higgins, III ........... 174/35 MS |
| 5,754,948 A | * | 5/1998 | Metze ......................... 455/66 |
| 5,987,431 A | * | 11/1999 | Johnston et al. ............... 705/35 |
| 6,078,789 A | * | 6/2000 | Bodenmann et al. ......... 455/66 |
| 6,246,575 B1 | * | 6/2001 | Barrus et al. ................ 361/686 |
| 6,286,099 B1 | * | 9/2001 | Kramer ....................... 713/172 |
| 6,457,640 B2 | * | 10/2002 | Ramachandran et al. ... 235/379 |
| 6,474,548 B1 | * | 11/2002 | Montross et al. ........... 235/379 |
| 6,484,380 B2 | * | 11/2002 | Graef et al. ................ 29/401.1 |
| 6,505,774 B1 | * | 1/2003 | Fulcher et al. .............. 235/381 |
| 6,520,408 B1 | * | 2/2003 | Force et al. ................. 235/379 |
| 6,620,999 B2 | * | 9/2003 | Pommerenke et al. . 174/35 GC |

FOREIGN PATENT DOCUMENTS

| | | |
|---|---|---|
| EP | 0090146 | 10/1983 |
| EP | 1024626 | 9/2000 |
| EP | 1102222 A2 * | 5/2001 |
| GB | 2025106 | 1/1980 |
| JP | 057430 | 2/2000 |
| WO | 9921141 | 4/1999 |

* cited by examiner

Primary Examiner—Nay Maung
Assistant Examiner—Sujatha Sharma
(74) Attorney, Agent, or Firm—Michael Chan

(57) ABSTRACT

A self-service terminal (10 or 200 or 300) comprises a plurality of intercommunicating modules (114 to 126, or 214 to 226, or 314 to 326). Each module includes a transceiver for wireless communication with another module. In one embodiment, the wireless communication is directed between two modules so that only those two modules can participate in the communication. In another embodiment, the wireless communication may be implemented by a transceiver broadcasting information to all of the modules.

7 Claims, 6 Drawing Sheets

SELF-SERVICE TERMINAL INCLUDING WIRELESS COMMUNICATION

BACKGROUND OF THE INVENTION

The present invention relates to a self-service terminal (SST). In particular, the present invention relates to a self-service terminal having a plurality of intercommunicating modules.

SSTs, such as automated teller machines (ATMs), typically provide a user with a range of services, such as cash dispensing, receipt printing, and such like. To provide these services, ATMs typically include several intercommunicating modules, such as a cash dispenser, an ATM controller and such like. As the data conveyed between modules is generally confidential, encryption techniques must be applied to the data. To perform encryption of data and to minimize the possibility of module failure, each module typically includes a controller comprising a microprocessor, memory, firmware, and such like. The controller provides intelligence for the module and collates state of health information for communicating to an ATM control module. These module requirements give rise to complex wiring arrangements for linking the intercommunicating modules.

If an additional module is to be added to the ATM to provide a new service, then the complex wiring arrangement must be modified to accommodate the additional module. This makes it a complex and difficult task to add additional modules to an installed ATM.

SUMMARY OF THE INVENTION

It is an object of the present invention to obviate or mitigate one or more of the above disadvantages or other disadvantages associated with the prior art.

According to a first aspect of the present invention there is provided a self-service terminal comprising a plurality of intercommunicating modules characterized in that each module is adapted for wireless communication with another module in the terminal.

By virtue of this aspect of the present invention no communication wiring is required to interconnect the modules as module intercommunication is performed using wire-free communications. This has the advantage that additional modules may be added without difficulty.

Preferably, each module has a transceiver for performing wireless communication. Alternatively, each module may have a separate transmitter and receiver.

The wireless communication may implement direct communication between two modules so that only those two modules are parties to the communication. Alternatively, all communications from a module may be broadcast to all other modules in the SST.

In embodiments where direct communication is used, each module may include a switching arrangement to direct the communication to the appropriate module. The communication system used may be based on infra-red (IR) radiation so that an optical switching arrangement may be used.

In embodiments where broadcast communication is used, a short range communication system, such as Bluetooth (trade mark) may be used.

Preferably, each module has a unique identifier so that a module that is transmitting information can include an identifier associated with the module for which the communication is intended.

Preferably, encryption techniques are used to encrypt data that is conveyed between modules.

Preferably, the SST includes a communication absorbing shield to reduce the amount of wireless communication signals that are transmitted to outside the SST. The shield may be applied to internal walls of the SST.

According to a second aspect of the invention there is provided a module for use in an SST, characterized in that the module includes a transceiver for wireless communication with another module.

Any convenient wireless communication system may be used, such as Bluetooth (trade mark), Infra-red radiation, radio-frequency radiation, or such like.

According to a third aspect of the invention there is provided a self-service terminal comprising a plurality of intercommunicating modules interconnected by power supply cables characterized in that each module is adapted for communication with another module by transmitting data using the power supply cables.

By virtue of this aspect of the present invention the only wiring that is required to interconnect the modules is the wiring that supplies power to the modules. This has the advantage that additional modules may be added by connecting the additional modules to the power supply.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
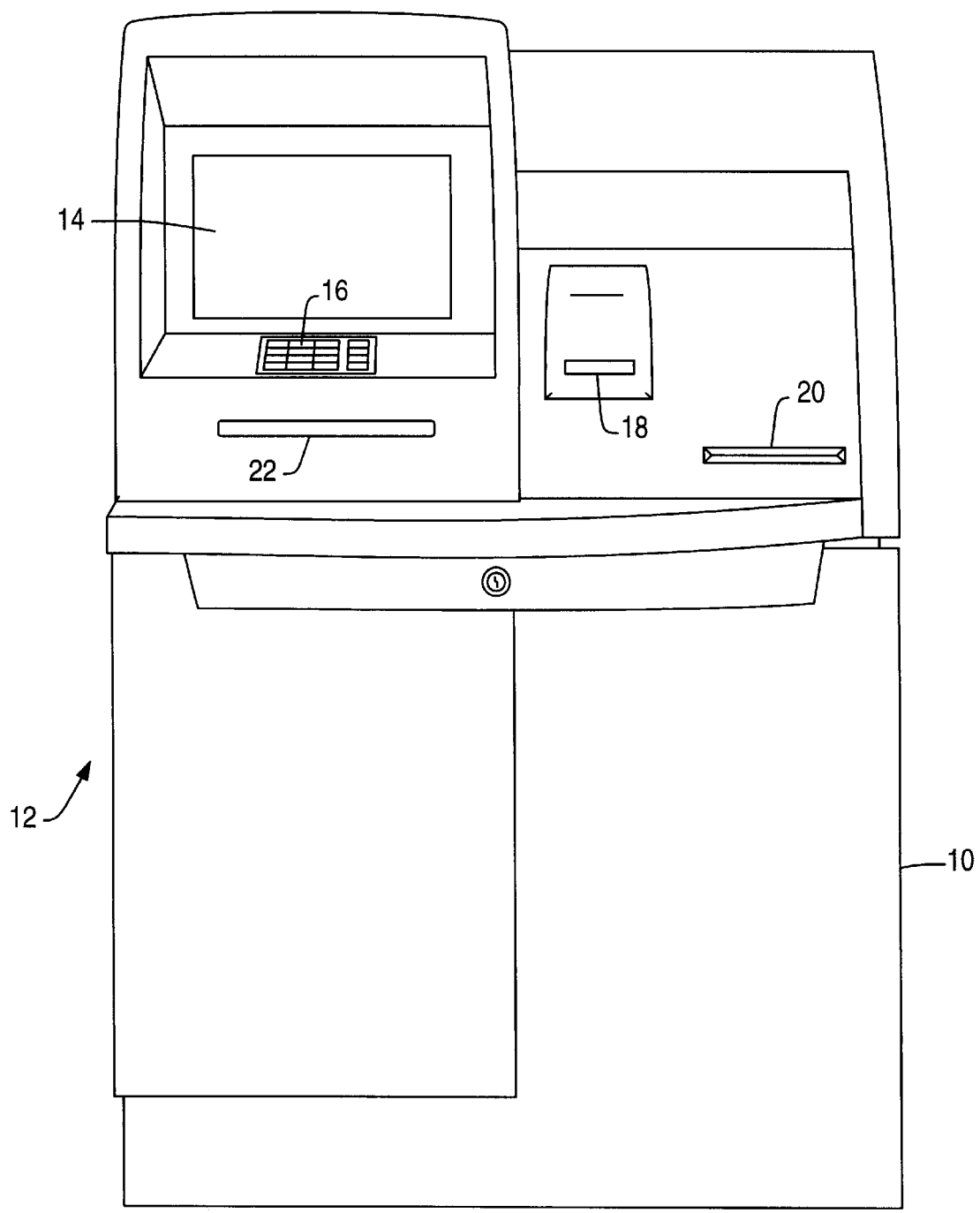
FIG. 1 is a pictorial view of the front of an ATM according to one embodiment of the present invention.

Referring to FIG. 1, there is shown an SST 10 in the form of an ATM. ATM 10 has a user interface 12 comprising the following user interface elements: a monitor 14, an encrypting keypad 16, a card insertion slot 18, a receipt dispense slot 20, and a cash dispense slot 22. The user interface slots 18,20,22 are associated with corresponding intercommunicating modules, as shown in FIG. 2.

Figure 2:
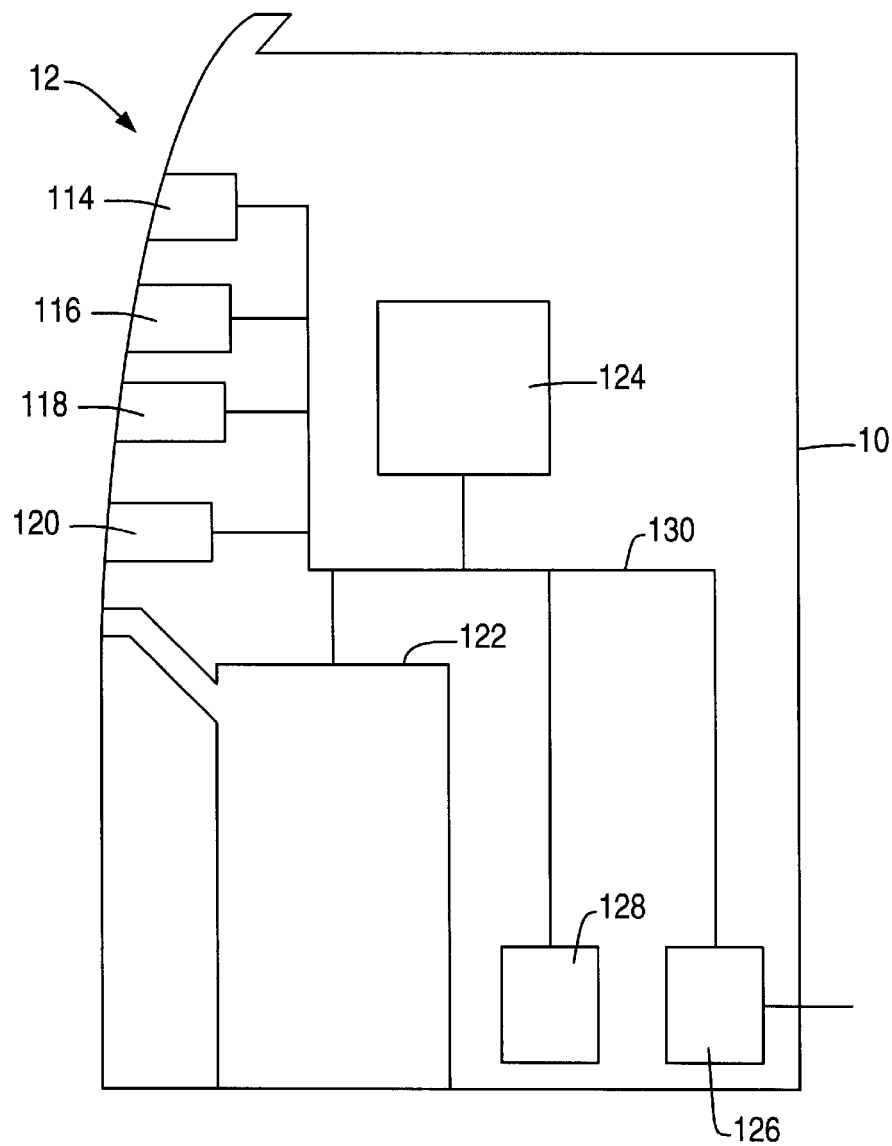
FIG. 2 is a block diagram of the ATM of FIG. 1 showing various intercommunicating modules.

FIG. 2 shows a monitor module 114, an encrypting keypad module 116, a magnetic card reader/writer (MCRW) module 118, a receipt printer module 120, and a cash dispenser module 122. The MCRW module 118 is aligned with the card insertion slot 18, the receipt printer module 120 is aligned with the receipt dispense slot 20, and the cash dispenser module 122 is aligned with the cash dispense slot 22.

FIG. 2 also shows an ATM controller module 124 for controlling the operation of the various modules (114 to 122), a network connection module 126 for communicating with a host device via a wide area network (not shown), and a power supply 128 for supplying power to modules 114 to 126 via cables 130. The power supply 128 is connected to a mains outlet (not shown). The power supply 128 includes one or more transformers and voltage regulators to supply low and/or high voltage power to the various modules in the ATM 10.

Figure 3:
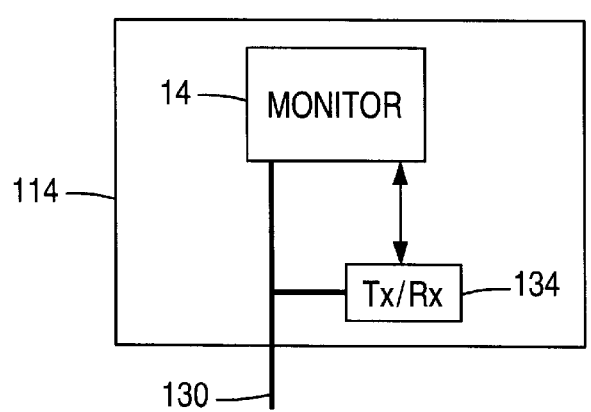
FIG. 3 is a block diagram of the monitor module of the ATM of FIG. 2.

Referring to FIG. 3, which shows the monitor module 114 in more detail, module 114 includes the monitor 14 and a radio unit 134 for wireless communication with the other modules 116 to 126. The radio unit is a Bluetooth (trade mark) compliant transceiver, available from Ericsson.

Figure 4:
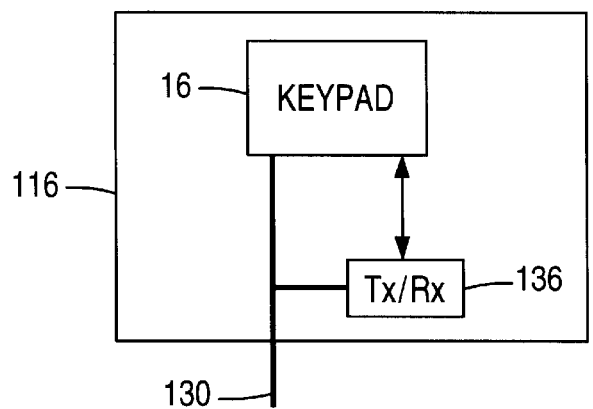
FIG. 4 is a block diagram of the keypad module of the ATM of FIG. 2.

Referring to FIG. 4, which shows the keypad module 116 in more detail, module 116 includes the encrypting keypad 16 and a Bluetooth (trade mark) radio unit 136 for wireless communication with the other modules 114 and 118 to 126.

Figure 5:
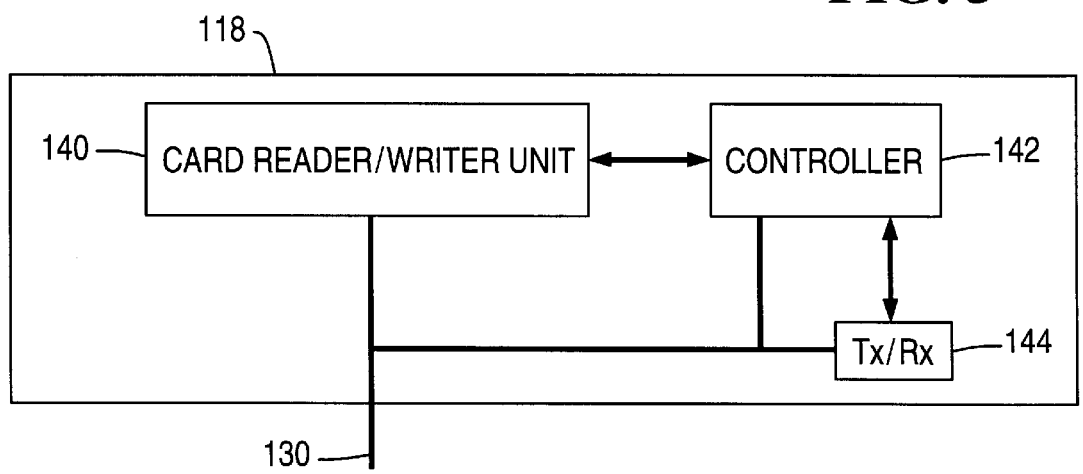
FIG. 5 is a block diagram of the motorized card reader module of the ATM of FIG. 2.

Referring to FIG. 5, which shows the MCRW module 118 in more detail, module 118 includes a card reader/writer unit 140 (suitable units are available from "Sankyo" (trade mark) 1-17-2, SHINBASHI, MINATO-KU, TOKYO, 1058633, Japan), a card unit controller 142 for controlling the operation of the card reader/writer unit 140, and a Bluetooth (trade mark) radio unit 144 for wireless communication with other modules. The controller 142 also performs state of health functions for the card reader/writer unit 140.

Figure 6:
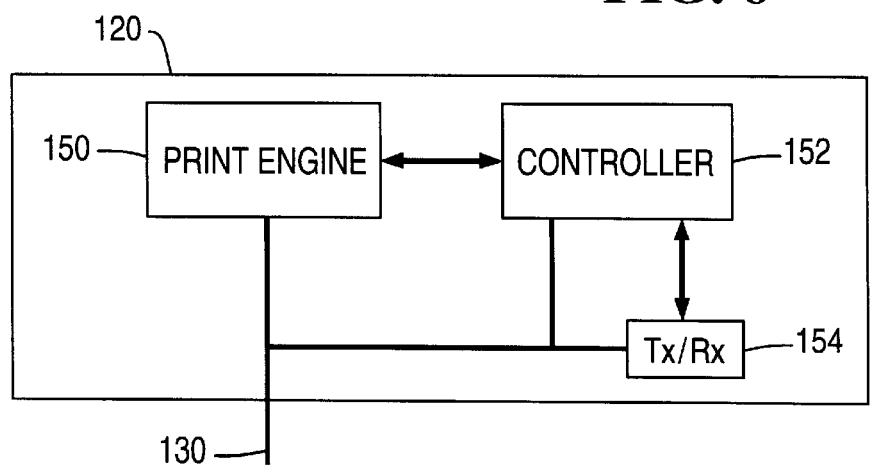
FIG. 6 is a block diagram of the print module of FIG. 2.

Referring to FIG. 6, which shows the receipt printer module 120 in more detail, module 120 includes a thermal print engine 150 for printing paper, a print engine controller 152 for controlling the print engine 150 and for providing state of health information relating to the print engine 150, and a Bluetooth (trade mark) radio unit 154 for wireless communication with other modules.

Figure 7:
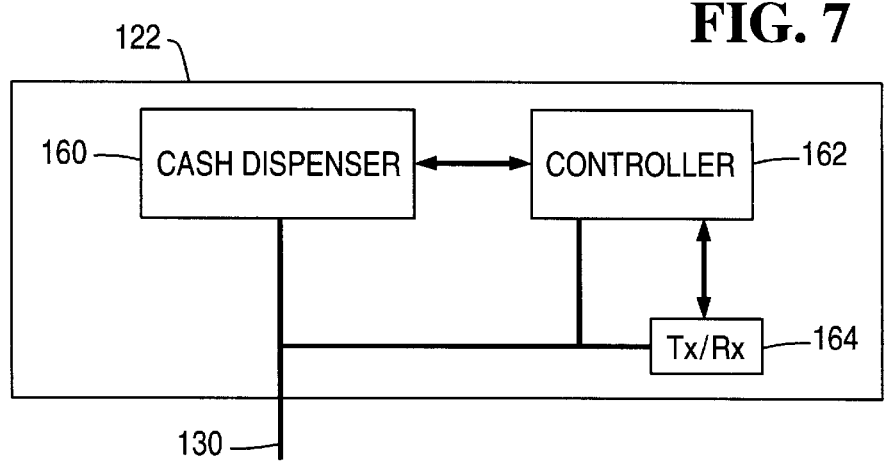
FIG. 7 is a block diagram of the cash dispenser module of FIG. 2.

Referring to FIG. 7, which shows the cash dispenser module 122 in more detail, module 122 includes a cash dispenser 160, a cash dispenser controller 162 for controlling the cash dispenser and for providing state of health information for the cash dispenser, and a Bluetooth (trade mark) radio unit 164 for wireless communication with other modules.

Figure 8:
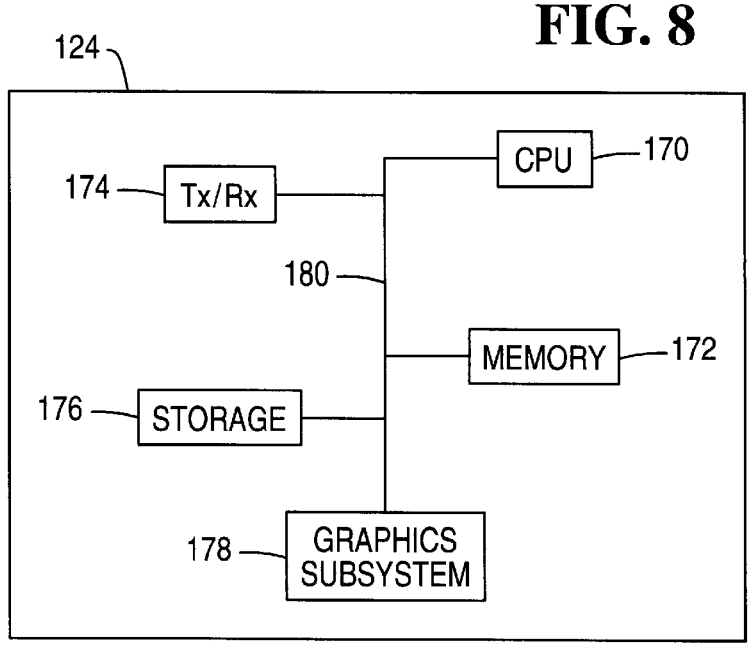
FIG. 8 is a block diagram of the ATM controller module of FIG. 2.

Referring to FIG. 8, which shows the ATM controller module 124 in more detail, module 124 includes a central processing unit 170 and associated memory 172, a Bluetooth (trade mark) radio unit 174 for wireless communication with other modules, a storage device 176 such as a magnetic disk drive, and a graphics sub-system 178, all interconnected by one or more buses 180. The graphics sub-system 178 includes a processor, memory, and firmware, for controlling the images and text displayed by the monitor 14.

Figure 9:
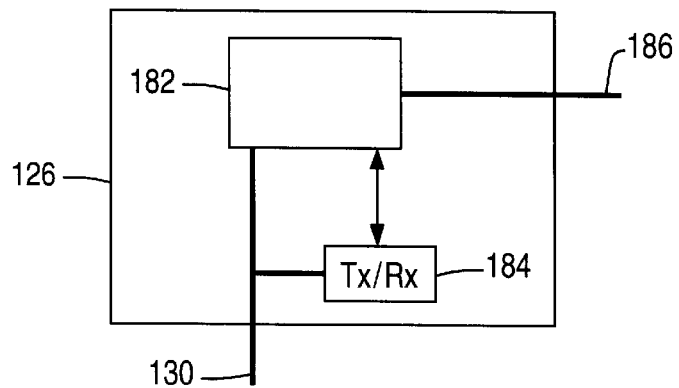
FIG. 9 is a block diagram of the network connection module of FIG. 2.

Referring to FIG. 9, which shows the network connection module 126 in more detail, module 126 includes a network connection device 182, a Bluetooth (trade mark) radio unit 184 for wireless communication with other modules, and a communication cable 186 for communicating with a wide area network (not shown).

The Bluetooth radio units (134, 136, 144, 154, 164, 174, and 184) are very similar; the only difference being that each unit has an associated unique identifier. Each radio unit is pre-programmed with the identifier for the ATM controller's radio unit 174, and the controller's radio unit 174 is pre-programmed with the identifier associated with the radio unit for each of the other modules in the ATM 10. This ensures that each module can communicate with the ATM controller 124 and that the ATM controller 124 can communicate with each of the other modules (114 to 122, and 126).

During operation of the ATM 10, various modules intercommunicate with the ATM controller module 124 to provide the functions and services associated with that ATM 10. For example, when a magnetic stripe card is inserted into the MCRW module 118 by a customer, the MCRW module 118 reads the magnetic information from tracks in the magnetic stripe and uses the MCRW radio unit 144 to transmit this information to the ATM controller's radio unit 174.

The graphics sub-system 178 then prepares the content and layout of the next screen to be displayed by the monitor 14. The next screen includes text requesting the customer to insert his or her PIN using the keypad 16 (FIG. 1). The graphics sub-system 178 then transmits this next screen information to the monitor module 114 using the radio unit 174. The monitor module 114 receives this information via its radio unit 134 and updates its display accordingly.

When the customer enters his or her PIN into the keypad 16, the keypad module 116 uses its radio unit 136 to transmit the encrypted PIN to the ATM controller 124 via the controller radio unit 174. The graphics sub-system 178 then prepares the content and layout of the next screen to be displayed by the monitor 14. The next screen includes text requesting the customer to select a transaction. Thus, in a similar manner as for a conventional ATM, the monitor module 114, the ATM controller module 124, and the keypad module 116 intercommunicate to allow a customer to enter his or her PIN and select a transaction.

If the customer requests withdrawal of cash, the ATM controller 124 collates the encrypted PIN received from the keypad's radio unit 136, the magnetic stripe information previously transmitted by the MCRW module 118, and the amount of cash requested by the customer. The ATM controller 124 then transmits this collated information to the network connection module 126 via the respective radio units 174 and 184.

On receiving this collated information, the network connection module 126 transmits this collated information to a host system (not shown) for remote authorization. As is well known in the art, the remote host system verifies that the PIN is correct and that the customer has sufficient funds to cover the withdrawal request.

On receiving authorization from the remote host system, the network connection 126 transmits this authorization to the ATM controller using radio unit 184, and the ATM controller 124 instructs the cash dispenser 160 (by wireless transmission using radio units 174 and 164) to dispense the requested cash.

It will be appreciated that if another module is to be added to the ATM 10, then that module only requires to receive a power connection via cable 130 and to have a radio unit that is compatible with the radio units installed in the modules presently included in the ATM 10. This greatly simplifies adding or removing modules.

It will also be appreciated that standard encryption techniques, such as DES encryption, may be used to encrypt transmissions between modules to reduce the possibility of third parties being able to access valuable information by intercepting or monitoring the transmissions between modules.

Figure 10:
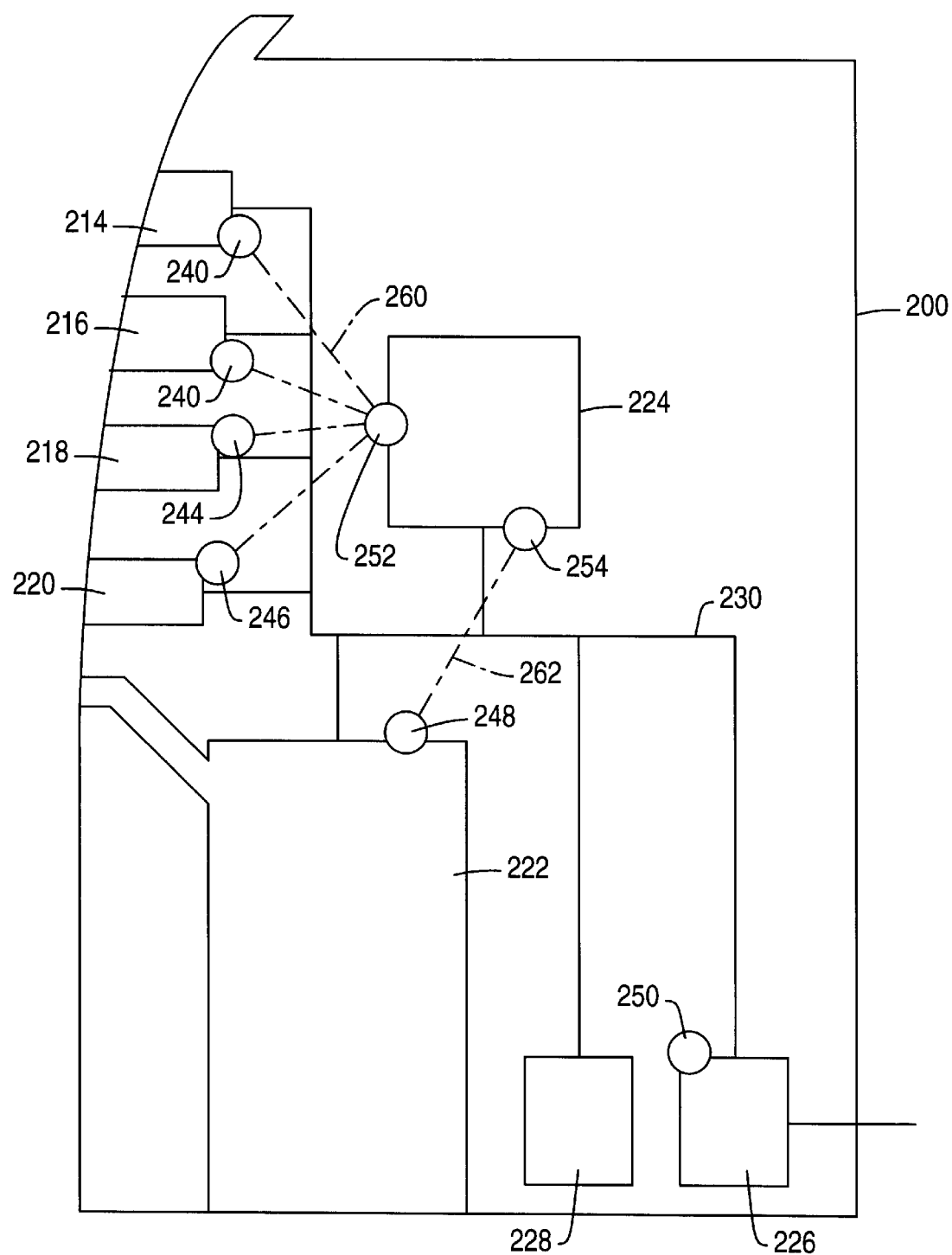
FIG. 10 is a block diagram of a second embodiment of the present invention.

Referring now to FIG. 10, which shows an alternative embodiment of the present invention, an ATM 200 includes a monitor module 214, a keypad module 216, a MCRW module 218, a printer module 220, a cash dispenser module 222, an ATM controller module 224, a network connection module 226, and a power supply 228 that supplies power to each of these modules 214 to 226 via cables 230.

Each of the monitor, keypad, printer, cash dispenser, and network connection modules has one switchable optical element (240 to 250 respectively) in the form of a rotatable prism for blocking or reflecting infra-red radiation; and the ATM controller module 224 has two switchable optical elements 252,254. Each of the optical elements (240 to 254) is in optical communication with an infra-red transceiver for transmitting and receiving infrared radiation.

When the ATM controller 224 is communicating with, for example, the monitor module 214, the ATM controller 224 rotates one of its prisms 252 so that the prism 252 aligns with the rotatable prism 240 associated with the monitor module. This provides an optical path between the two modules 214,224, as illustrated by broken line 260, thereby allowing infra-red communication between the modules.

When the ATM controller 224 is communicating with, for example, the cash dispenser module 222, the ATM controller 224 rotates the prism 252 so that it cannot receive communications from any of modules 214 to 220, and rotates prism 254 so that it aligns with prism 248. This provides an optical path between the two modules 222,224 as illustrated by broken line 262, thereby allowing infra-red communication between the modules 222,224.

It will be appreciated that this embodiment has the advantage that modules can only communicate with each other if there is an optical path between the modules, and a module can switch off an optical path to stop communications to or from that module, thereby providing added security against unauthorized modules that may be present in the ATM.

Figure 11:
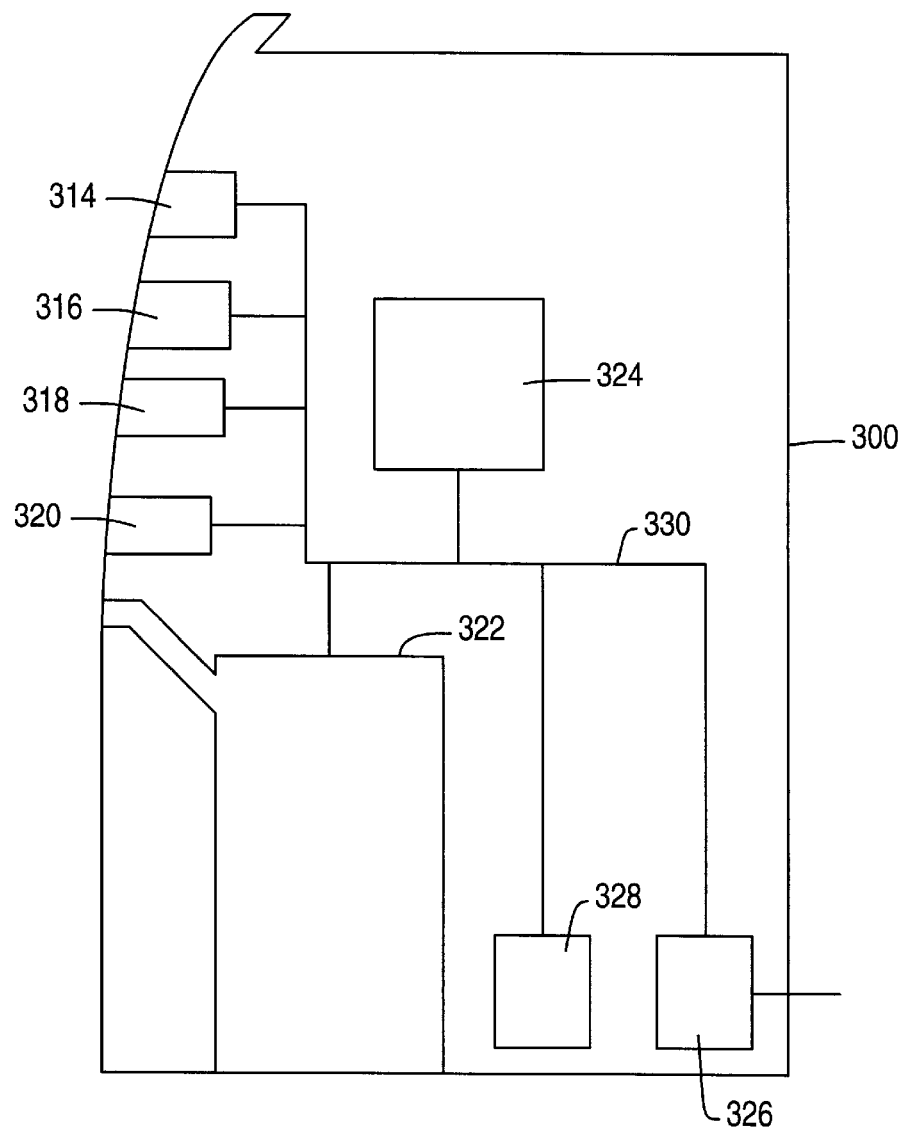
FIG. 11 is a block diagram of a third embodiment of the present invention.

Referring now to FIG. 11, which shows another embodiment of the present invention, an ATM 300 comprises a monitor module 314, a keypad module 316, a MCRW module 318, a printer module 320, a cash dispenser module 322, an ATM controller module 324, a network connection module 326, and a power supply 328. The power supply performs two different functions: supplying power to each of the modules 314 to 326, and conveying information between each of the modules 314 to 326; both of these functions are performed using power cables 330. That is, the power cables 330 convey both power and information simultaneously.

Figure 12:
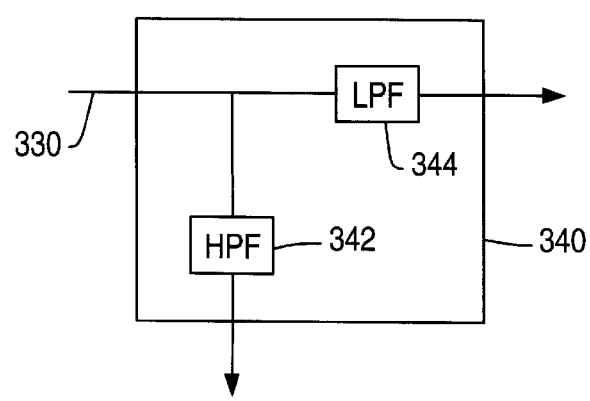
FIG. 12 is a block diagram of a part of each module used in the embodiment of FIG. 11.

Each module 314 to 326 includes a frequency sensitive directional coupler 340, as shown in FIG. 12. The coupler 340 includes a high pass filter 342 to filter out the power supply component, and a low pass filter 344 to filter out the high frequency information component. The output of the low pass filter 344 is conveyed to power the module; whereas, the output of the high pass filter 342 is conveyed to a communications port in the module (not shown). Using a power cable to convey both power and information is a known technique, for example, Nortel's Digital Powerline Technology (trade mark) uses this technique. This enables modules to communicate using the power cables 330 to carry information.

Various modifications may be made to the above described embodiments within the scope of the invention. For example, in embodiments similar to the first embodiment, the transceiver may be an IrDA transceiver, an IR transceiver, or any convenient transmitter/receiver unit. In other embodiments, the power supply 128 and cables 130 may be replaced by an active power plane that extends over a large portion of an internal wall of the ATM 10. In other embodiments, a communication absorbing shield may be used to reduce the magnitude of any signals that are transmitted outside the ATM. In embodiments similar to the second embodiment, any convenient switchable optical element may be used, such as a mirror. In other embodiments, the ATM may be a kiosk, an information terminal, or some other type of self-service terminal.

What is claimed is:

1. An automated teller machine (ATM) for executing ATM transactions, the ATM comprising:
    means defining an ATM housing;
    a cash dispenser module located within the ATM housing and including a wireless transceiver for transmitting and receiving wireless signals;
    an ATM controller module located within the ATM housing and including a wireless transceiver for transmitting encrypted wireless signals to instruct the cash dispenser module to dispense cash; and
    a communication absorbing shield for reducing magnitude of encrypted wireless signals transmitted from inside the ATM housing to outside the ATM housing.

2. An ATM according to claim 1, wherein the communication absorbing shield is disposed on internal walls of the ATM housing.

3. An ATM according to claim 1, wherein each wireless transceiver includes means for broadcasting encrypted wireless signals to all other ATM modules within the ATM housing.

4. An ATM according to claim 3, wherein each wireless transceiver broadcasts encrypted wireless signals using a short range radio link.

5. An ATM according to claim 1, further comprising another ATM module selected from the group consisting of an ATM monitor module, an ATM keypad module, an ATM card reader module, an ATM receipt printer module, and an ATM network connection module.

6. An ATM according to claim 5, further comprising switching means for directing encrypted wireless signals between two ATM modules so that only the two ATM modules are parties to the communication.

7. A method of transmitting encrypted wireless signals within an automated teller machine (ATM) having an ATM controller module and a cash dispenser module, the method comprising the steps of:
    transmitting encrypted wireless signals from the ATM controller module to the cash dispenser module to instruct the cash dispenser module to dispense cash; and
    shielding an area external to the ATM from encrypted transmitted wireless signals by absorbing the transmitted encrypted wireless signals to reduce magnitude of the transmitted encrypted wireless signals.

* * * * *